(12) United States Patent
Crompvoets et al.

(10) Patent No.: US 11,181,682 B2
(45) Date of Patent: Nov. 23, 2021

(54) SEGMENTED BACKLIGHT STRUCTURE

(71) Applicant: Lumileds LLC, San Jose, CA (US)

(72) Inventors: Floris Maria Hermansz Crompvoets, Bunde (NL); Ernő Fancsali, Heusden-Zolder (BE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/387,140

(22) Filed: Apr. 17, 2019

(65) Prior Publication Data

US 2019/0324190 A1 Oct. 24, 2019

Related U.S. Application Data

(60) Provisional application No. 62/659,581, filed on Apr. 18, 2018.

(30) Foreign Application Priority Data

Jun. 28, 2018 (EP) .................................... 18180334

(51) Int. Cl.
*F21V 8/00* (2006.01)
(52) U.S. Cl.
CPC ......... *G02B 6/0073* (2013.01); *G02B 6/0046* (2013.01); *G02B 6/0055* (2013.01); *G02B 6/0068* (2013.01)
(58) Field of Classification Search
CPC ............... G02B 6/0021; G02B 6/0078; G02F 1/133603
See application file for complete search history.

(56) References Cited

U.S. PATENT DOCUMENTS

| 8,506,148 | B2 * | 8/2013 | Shimizu | G02B 6/0016 |
| | | | | 362/606 |
| 2005/0265042 | A1 * | 12/2005 | Kim | F21K 9/00 |
| | | | | 362/555 |
| 2007/0268429 | A1 * | 11/2007 | So | G02F 1/133603 |
| | | | | 349/106 |
| 2008/0137335 | A1 * | 6/2008 | Tsai | G02B 5/0247 |
| | | | | 362/247 |

(Continued)

FOREIGN PATENT DOCUMENTS

| KR | 20060058971 A | * | 6/2006 |
| KR | 2009073452 A | * | 7/2009 |

(Continued)

OTHER PUBLICATIONS

"International Application Serial No. PCT/EP2019/059212, International Search Report dated Jun. 13, 2019", 4 pgs.

(Continued)

*Primary Examiner* — Mariceli Santiago
(74) *Attorney, Agent, or Firm* — Schwegman Lundberg & Woessner, P.A.

(57) ABSTRACT

An LED backlight system having a plurality of backlight segments including an integral light waveguide, each backlight segment supporting a sidelight emitting LED. A light guide having a rectangular shape, a flat top surface, and a curved lower surface defines a cavity having a top and sidewalls, with the sidelight emitting LED positioned in the cavity. At least one of a reflective layer and a top outcoupling structure can be positioned between the top of the cavity and the sidelight emitting LED.

15 Claims, 8 Drawing Sheets

(56) References Cited

U.S. PATENT DOCUMENTS

| | | | |
|---|---|---|---|
| 2009/0040768 A1 | 2/2009 | Zhu et al. | |
| 2009/0086508 A1* | 4/2009 | Bierhuizen | G02B 6/0021 |
| | | | 362/617 |
| 2010/0073597 A1 | 3/2010 | Bierhuizen et al. | |
| 2010/0110330 A1 | 5/2010 | Ajichi et al. | |
| 2010/0165252 A1 | 7/2010 | Tsujii | |
| 2017/0371087 A1 | 12/2017 | You et al. | |

FOREIGN PATENT DOCUMENTS

| | | | | |
|---|---|---|---|---|
| WO | WO-2010058625 A1 * | 5/2010 | | G02B 6/0021 |
| WO | WO-2011030941 A1 * | 3/2011 | | G02B 6/0078 |
| WO | WO-2019/201727 A1 | 10/2019 | | |

OTHER PUBLICATIONS

"International Application Serial No. PCT/EP2019/059212, Written Opinion dated Jun. 13, 2019", 8 pgs.
"European Application Serial No. 18180334.7, extended European Search Report Action dated Dec. 7, 2018", 9 pgs.
"International Application Serial No. PCT/EP2019/059212, International Preliminary Report on Patentability dated Oct. 29, 2020", 10 pgs.
"European Application Serial No. 19715942.9, Response filed May 19, 2021 to Communication dated Nov. 26, 2020", 10 pgs.

\* cited by examiner

SEGMENTED BACKLIGHT STRUCTURE

FIELD OF INVENTION

This invention relates to the field of light emitting devices, and in particular to a pixelated light emitting backlight structure for high dynamic range display devices.

BACKGROUND

Mobile, tablet, laptop, or larger electronic displays ideally have a large contrast between dark and light parts of the image. Since a human eye has a very high dynamic range (HDR) of 14 orders of magnitude, displays that support high contrast range allow for more faithful images to be rendered. High dynamic range displays should have high contrast, a very black state and high peak brightness, and allow for precise control of light levels. For example, an organic LED (OLED) based display can typically have perfect black (no light), offering a high contrast that supports HDR viewing. In comparison, liquid crystal displays (LCD) are not able to support perfect black due to light leakage from the backlight through the optical system. However, maximum light output for LCDs is generally higher than for OLED displays, allowing for extension of the dynamic range at the brighter end. If black values can be significantly reduced, LCD displays can match or exceed the dynamic range of OLEDS.

One recognized way of reducing black values in LCD displays is to switch off the backlight (locally) to enhance the contrast of an image. The smaller the area of the backlight that can be switched off, the better the contrast resolution. This technique is often applied in LCD based TV sets and is commonly called full array local dimming (FALD).

Unfortunately, conventional FALD techniques do not work on smaller displays provided for laptops, tablets, and mobile devices, primarily due to thinness (typically less than 0.4 mm) of the supporting backlight. LEDs supporting FALD are embedded in a light guide and normally emit light from the top. With a very thin backlight, the LED would be clearly visible through the light guide layer and the rest of the optical system (brightness enhancement and diffuser foils). Replacement of top-lighting LED sources with sidelight-emitting LEDs having virtually no emission from the top of the package is not feasible, since this would create a "black hole" right above LED, rather than a uniform illuminance.

SUMMARY

In accordance with embodiments of the invention, an LED backlight system includes a plurality of backlight segments including an integral light waveguide, each backlight segment supporting a sidelight emitting LED. A light guide having a rectangular shape, a flat top surface, and a curved lower surface defines a cavity having a top and sidewalls, with the sidelight emitting LED positioned in the cavity. At least one of a reflective layer and a top out-coupling structure can be positioned between the top of the cavity and the sidelight emitting LED.

In some embodiments the backlight segments are separated from each other by an optical barrier which can include a reflective coating or light absorbing layer. Each of the plurality of backlight segments can be positioned adjacent to at least one other backlight segment on a printed circuit board substrate.

A sidewall out-coupling structure can be positioned between the sidewalls of the cavity and the sidelight emitting LED. In some embodiments only the top out-coupling structure is positioned between the top of the cavity and the sidelight emitting LED, while in others an additional reflective layer is formed on the top out-coupling structure.

The plurality of backlight segments can be positioned adjacent to each other on a printed circuit board substrate and can be similarly sized to allow for modular layouts. Each sidelight emitting LED can be centrally positioned in the respective backlight segment.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
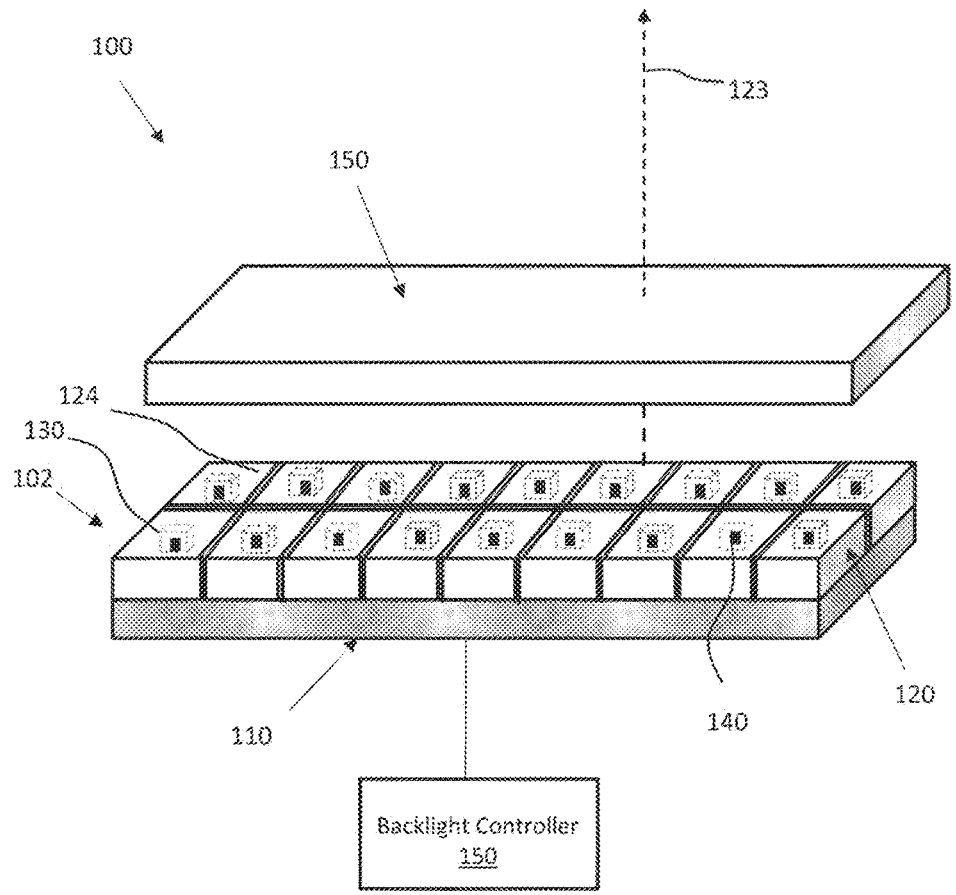
FIG. 1 illustrates one embodiment of an LED display system including individually controlled segmented backlight.

FIG. 1 illustrates one embodiment of an LED backlight display system 100 including an individually controlled segmented backlight 102. A printed circuit board 110 supports each light waveguide segment 120 and connects LED(s) to a backlight controller 150. The LEDs 140 are positioned within cavities 130 defined within the light waveguide segments 120. Near uniformly distributed light 123 of a controllable and distinct intensity can be emitted from a top surface 124 of each backlight segment 102 to pass through an LCD pixel display element suitable for mobile, tablet, laptop, or other devices. In some embodiments, full array local dimming (FALD) is supported even though thickness of the light waveguide segment 120 can be significantly less than 1 mm, and in certain embodiments, between about 0.3 to 0.5 mm in thickness. The LED backlight display system 100 such as described can also support a homogeneity of 90%, either defined as a contrast between light and dark in specific region of interest, or as the standard deviation in illuminance divided by the average illuminance in the region of interest.

In some embodiments, single or multiple LEDS can be associated with each light waveguide segment 120. In other embodiments, cubic or rectangular LEDs with strong sidelight emission on all four sides and limited top and bottom emission can be used. Top emission can be further limited by scattering elements or applied reflective or light absorbing coatings. Semiconductor materials capable of forming high-brightness LEDs can include, but are not limited to, indium gallium nitride, aluminum gallium nitride, aluminum gallium indium nitride, and other suitable Group III-V semiconductors, particularly binary, ternary, and quaternary alloys of gallium, aluminum, indium, and nitrogen, also referred to as III-nitride materials. As will be appreciated, various other modifications to the LED architecture and materials are possible. LED segments can be overlain with wavelength converting materials such as phosphors, quantum dots, or dyes. Multiple types and thicknesses of phosphors can be used. An LED combined with one or more wavelength converting materials may be used to create white light or monochromatic light of other colors. In some embodiments, microlenses or other primary or secondary optical elements (including reflectors, scattering elements, or absorbers) may be attached to each LED or associated phosphor. Protective layers, transparent layers, thermal layers, or other packaging structures can be used as needed.

Each LED is positioned with a cavity 130 defined within a light waveguide segments 120. In some embodiments each light waveguide segment 120 has rectangular or square boundaries and can be constructed to have a common size to simplify modular increase or decrease in the number and layout of the segments 120. In some embodiments the light waveguide segments are 5×5 mm slab with a thickness of less than 0.4 mm. Typical material include poly(methyl methacrylate) (PMMA), other acrylics, or other optical grade plastic.

The cavity 130 can be generally cubic, rectangular, truncated pyramidal, circular, elliptical, or other suitably defined shape able to accommodate an LED. In some embodiments, a small gap is created between the top of the LED and the top of the cavity. A gap can also be formed between the sides of the LED and the cavity sidewalls Advantageously, these gaps reduce required tolerances for placement of the LED within the cavity, simplifying manufacture and assembly.

Top emission can be reduced using specular or diffuse reflective coatings. In-coupling and out-coupling of light from the light waveguide segments 120 can be improved by use of 3-dimensional scattering structures, defined or molded grooves, pyramids, or notches, as well as printed white dot patterns. These structures or patterns can be defined on the cavity sidewalls or top of the cavity. In some embodiments, reflective or scattering layers can be formed over such light in and out-coupling structures. In particular embodiments, at least one of a reflective layer and a top out-coupling structure are positioned between the top of the cavity and the LED.

In other embodiments, an edge of the light guide segment 120 can include optical absorbers or reflectors to reduce light crosstalk between adjacent light guide segments 120. Deflecting light through the top surface can be enabled by suitable out-coupling structures defined or positioned within the light guide segments. These can be 3-dimensional scattering structures, defined or molded grooves, pyramids, or notches, as well as printed white dot patterns. Homogeneity can also be improved by use of scattering, homogenizing, or diffuser foils or films positioned over the top surface 124. In some embodiments, brightness enhancement foils can also be included to improve peak luminance. Such foils or films can be discrete, covering a single light waveguide segment 120, or can cover two or more light waveguide segments 120. Advantageously, for those embodiments in which a foil or film is coextensive with the backlight, a low level of lateral light diffusion can help smooth over visual seams and reduce any visual gradients between light waveguide segments 120.

Figure 2A:
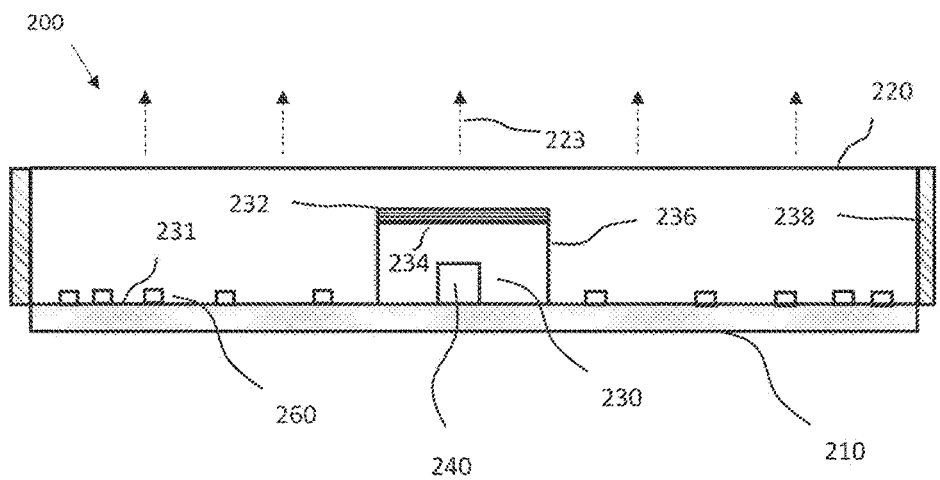
FIG. 2A illustrates one embodiment of an LED backlight with a light waveguide having a cavity into which an LED is fitted.

FIG. 2A illustrates (in cross section) one embodiment of an LED backlight 200 showing a single integrally formed light waveguide segment 220 supported on a printed circuit board 210. The light waveguide segment 220 has a cavity 230 defined therein into which a sidelight emitting, generally cubical or rectangular solid shaped LED 240 is fitted. A top of the cavity 232 is coated with a reflector 234. Light in-couplings structures can be formed or defined in cavity sidewalls 236, while light out-coupling structures 260 can be formed on or near the bottom surface 231 of the light waveguide segment 220. In effect, side emitted light from the LED 240 enters the light waveguide segment 220 and is redirected to provide a nearly homogeneous backlight 223. Light transfer to any adjacent light waveguide segments is limited by a reflective light barrier 238 covering edges of the light waveguide segment 220.

Figure 2B:
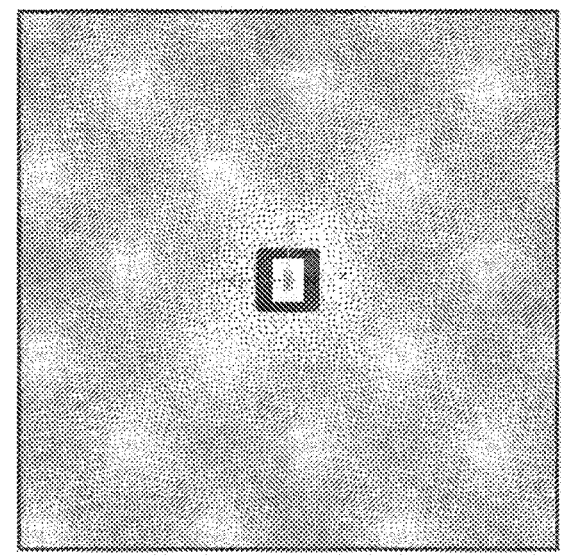
FIG. 2B is a simulation result illustrating near uniform light output for an LED backlight such as shown in FIG. 2A.

FIG. 2B is a simulation result graph 201 illustrating near uniform light output for an LED backlight such as shown in FIG. 2A. As compared to other disclosed embodiments herein, a recognizable central brightness peak is still present when a top reflector is used alone.

Figure 3A:
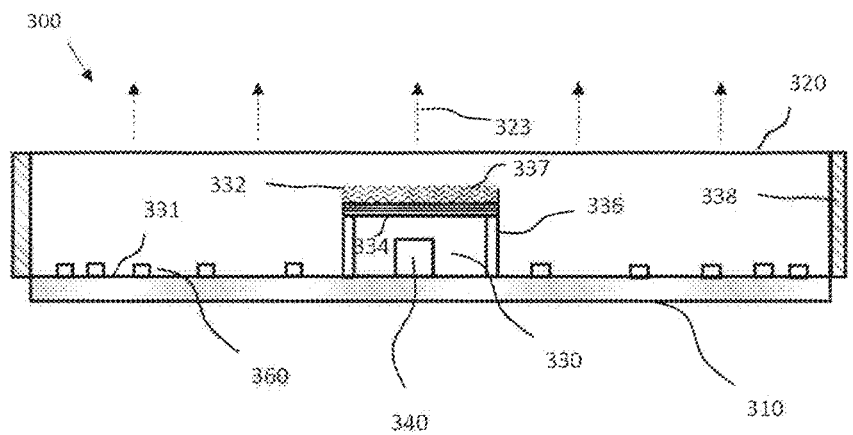
FIG. 3A illustrates one embodiment of an LED backlight having a top out-coupling structure positioned between the top of the cavity and an sidelight emitting LED.

FIG. 3A illustrates one embodiment of an LED backlight having a top out-coupling structure positioned between the top of the cavity and a sidelight emitting LED. Similar to the structure discussed with respect to FIG. 2A, FIG. 3A has an LED backlight 300 including a single integrally formed light waveguide segment 320 supported on a printed circuit board 310. The light waveguide segment 320 has a cavity 330 defined therein into which a sidelight emitting, generally cubical or rectangular solid shaped LED 340 is fitted. A top of the cavity 332 is first coated with out-coupling structures 337 that can include formed or defined structures or scattering layers. A reflector 334 is formed on the out-coupling structures 337. Light in-coupling structures can be formed or defined in cavity sidewalls 336, while light out-coupling structures 360 can be formed on or near the bottom surface 331 of the light waveguide segment 320. In effect, side emitted light from the LED 340 enters the light waveguide segment 320 and is redirected to provide a nearly homogeneous backlight 323. Light transfer to any adjacent light waveguide segments is limited by a reflective light barrier 338 covering edges of the light waveguide segment 320.

Figure 3B:
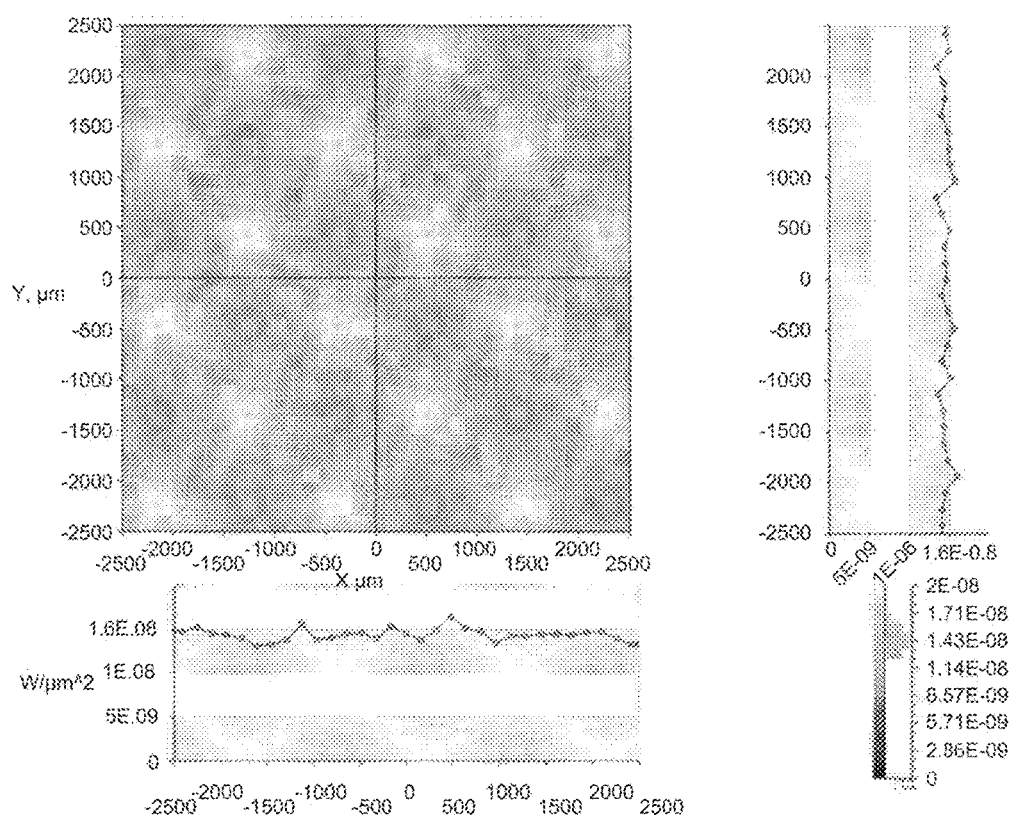
FIG. 3B is a simulation result illustrating near uniform light output for an LED backlight such as shown in FIG. 3A.

FIG. 3B is a simulation result illustrating near uniform light output for an LED backlight such as shown in FIG. 3A. As can be seen, use of combined reflector 336 and out-coupling structures 337 results in improved light homogeneity and a greatly reduced central brightness peak as compared to structures such as illustrated in FIGS. 2A and 2B.

Figure 4A:
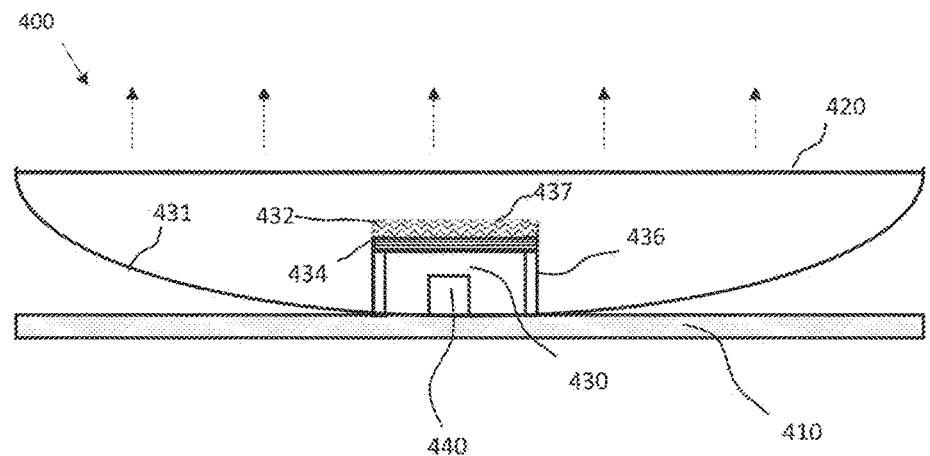
FIG. 4A illustrates one embodiment of an LED backlight with a curved and tapered light waveguide having a cavity into which an LED is fitted.

FIG. 4A illustrates one embodiment of an LED backlight with a curved and tapered light waveguide having a cavity into which an LED is fitted. As illustrated, FIG. 4A has an LED backlight 400 including a single integrally formed light waveguide segment 420 supported on a printed circuit board 410. The curved and tapered light waveguide segment 420 has a cavity 430 defined therein into which a sidelight emitting, generally cubical or rectangular solid shaped LED 440 is fitted. A top of the cavity 432 is first coated with out-coupling structures 437 that can include formed or defined structures or scattering layers. A reflector 434 is formed on the out-coupling structures 437. Light in-couplings structures can be formed or defined in cavity sidewalls 436. Light in-couplings structures can be formed or defined in cavity sidewalls 436, while light out-coupling structures (not shown) can be formed on or near the bottom surface 431 of the light waveguide segment 420. Because of the curvature of the light guide and use of tapered edges, little or no light is emitted from the edge, reducing or eliminating the need for edge attached light absorbers or reflectors. In practice, edges will have some thickness, but can generally be manufactured to have a thickness or edge height of less than 300 microns and can have an edge height between 50 and 200 microns, with 100 microns being typical.

Figure 4B:
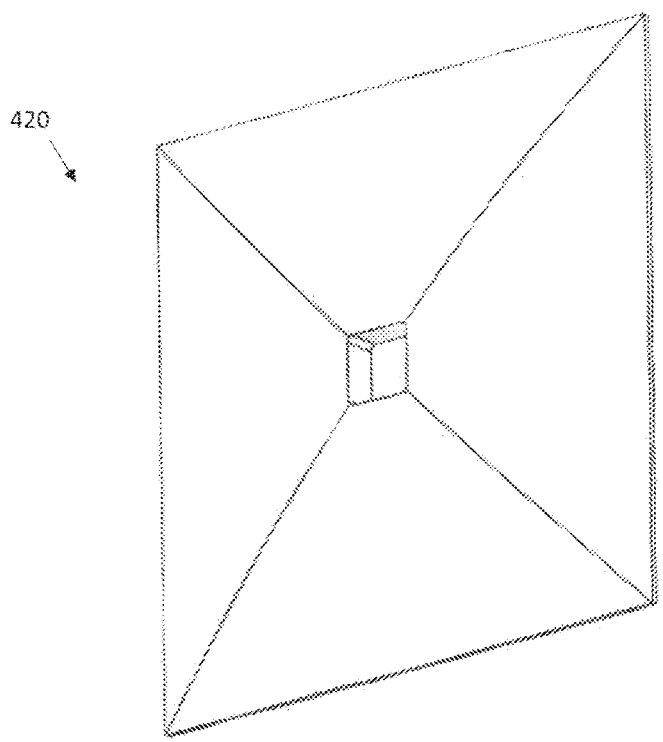
FIG. 4B is a perspective view curved and tapered light waveguide such as shown in FIG. 4A.

FIG. 4B is a perspective view of a curved and tapered light waveguide segment 420 such as shown in FIG. 4A. As illustrated, a generally square or rectangular waveguide segment 420 is defined in part by four triangular shaped faces. An LED can be mounted in a cavity defined near the center of the waveguide segment 420.

Figure 5A:
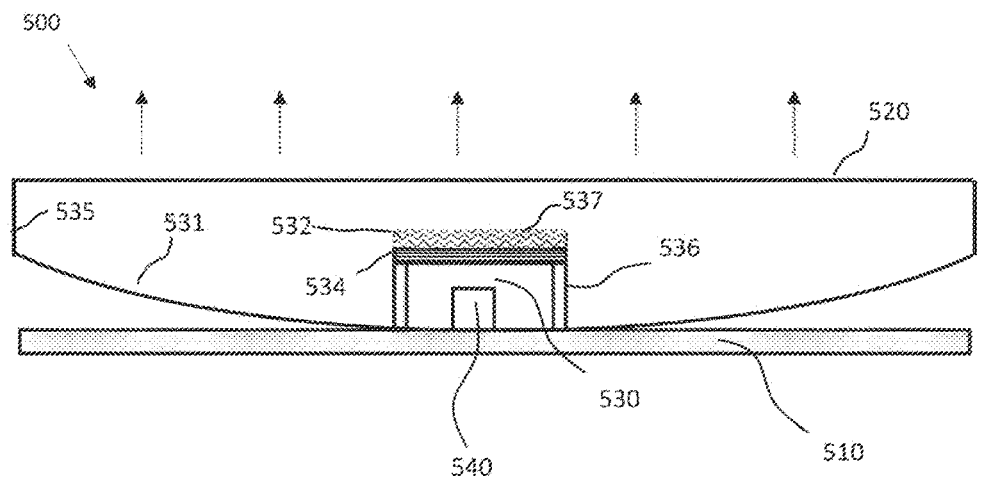
FIG. 5A illustrates one embodiment of an LED backlight with a curved and rectangular edged light waveguide having a cavity into which an LED is fitted.

FIG. 5A illustrates one embodiment of an LED backlight with a curved and rectangular edged light waveguide having a cavity into which an LED is fitted. As illustrated, FIG. 5A has an LED backlight 500 including a single integrally formed light waveguide segment 520 that defines a curve, has an edge, and is supported on a printed circuit board 510. The curved and tapered light waveguide segment 520 has a cavity 530 defined therein into which a sidelight emitting, generally cubical or rectangular solid shaped LED 540 is fitted. A top of the cavity 532 is first coated with out-coupling structures 537 that can include formed or defined structures or scattering layers. A reflector 534 is formed on the out-coupling structures 537. Light in-couplings structures can be formed or defined in cavity sidewalls 536. Light in-couplings structures can be formed or defined in cavity sidewalls 536, while light out-coupling structures (not shown) can be formed on or near the bottom surface 531 of the light waveguide segment 520. An edge 535 of the light guide segment 520 can include optical absorbers or reflectors to reduce light crosstalk between adjacent light guide segments.

Figure 5B:
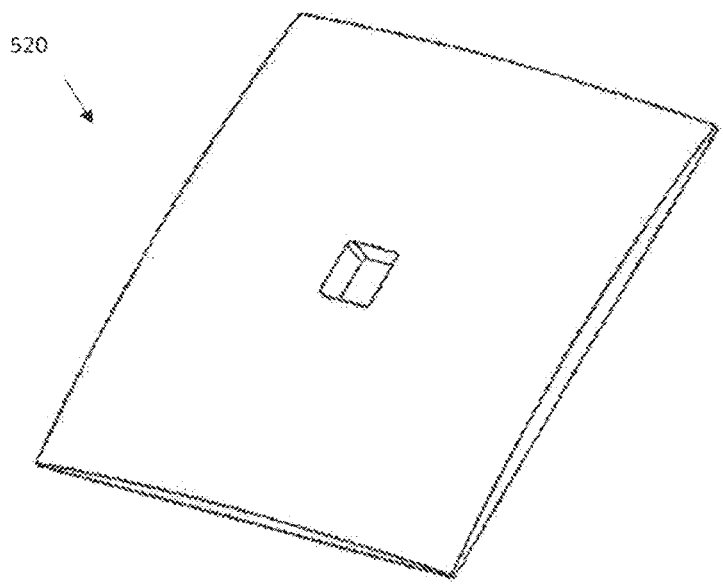
FIG. 5B is a perspective view of a curved and rectangular edged light waveguide such as shown in FIG. 5A.

FIG. 5B is a perspective view of a curved and rectangular edged light waveguide segment 520 such as shown in FIG. 5A. As illustrated, a generally square or rectangular waveguide segment 520 is defined by a smooth surface terminating in edges that have a lesser height at corners as compared to centers of the respective edges. An LED can be mounted in a cavity defined near the center of the waveguide segment 520.

Figure 6A:
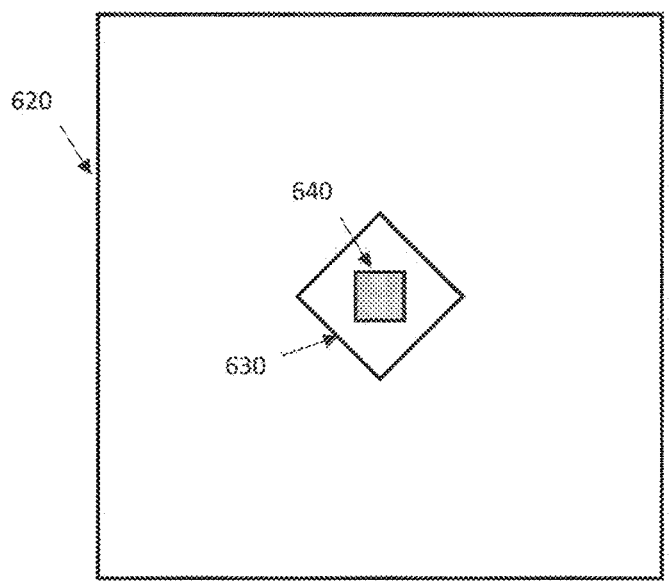
FIG. 6A illustrates relative position of a cube shaped LED in a square cavity in the light waveguide.

FIG. 6A illustrates relative position of a cube shaped LED 640 in a square cavity 630 in a light waveguide 620. In this embodiment, the LED is rotated with respect to the cavity 630 so that edges of the LED 640 face corners of square cavity 630, while edges of the cavity 630 face corners of the LED 640.

Figure 6B:
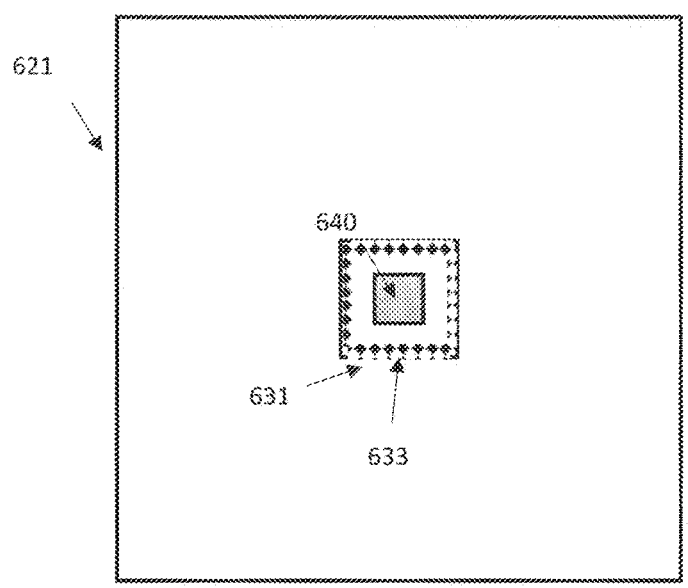
FIG. 6B illustrates relative position of a cube shaped LED in a square cavity in the light waveguide, with the light waveguide supporting prisms for light in-coupling.

FIG. 6B illustrates relative position of a cube shaped LED 640 in a square cavity 631 in the light waveguide 621, with the light waveguide 621 supporting sidewall prisms 633 for improved light in-coupling. The sidewall prisms 633 effectively define a Fresnel representation of the rotated cavity of FIG. 6A with the advantage of improved light spreading functionality.

Figure 7A:
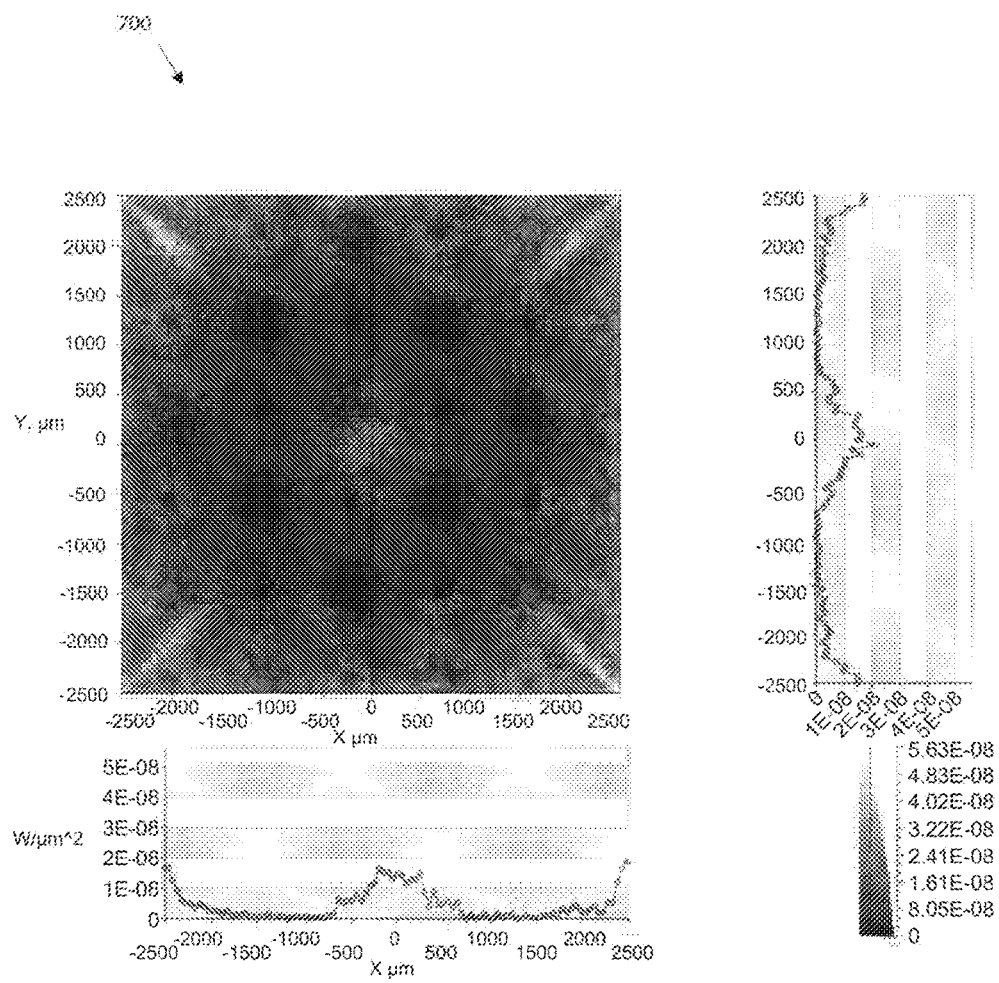
FIG. 7A is a simulation result illustrating near uniform light output for an LED backlight such as shown in FIG. 6B.

FIG. 7A is a simulation result graph 700 illustrating near uniform light output for an LED backlight such as shown in FIG. 6B.

Figure 7B:
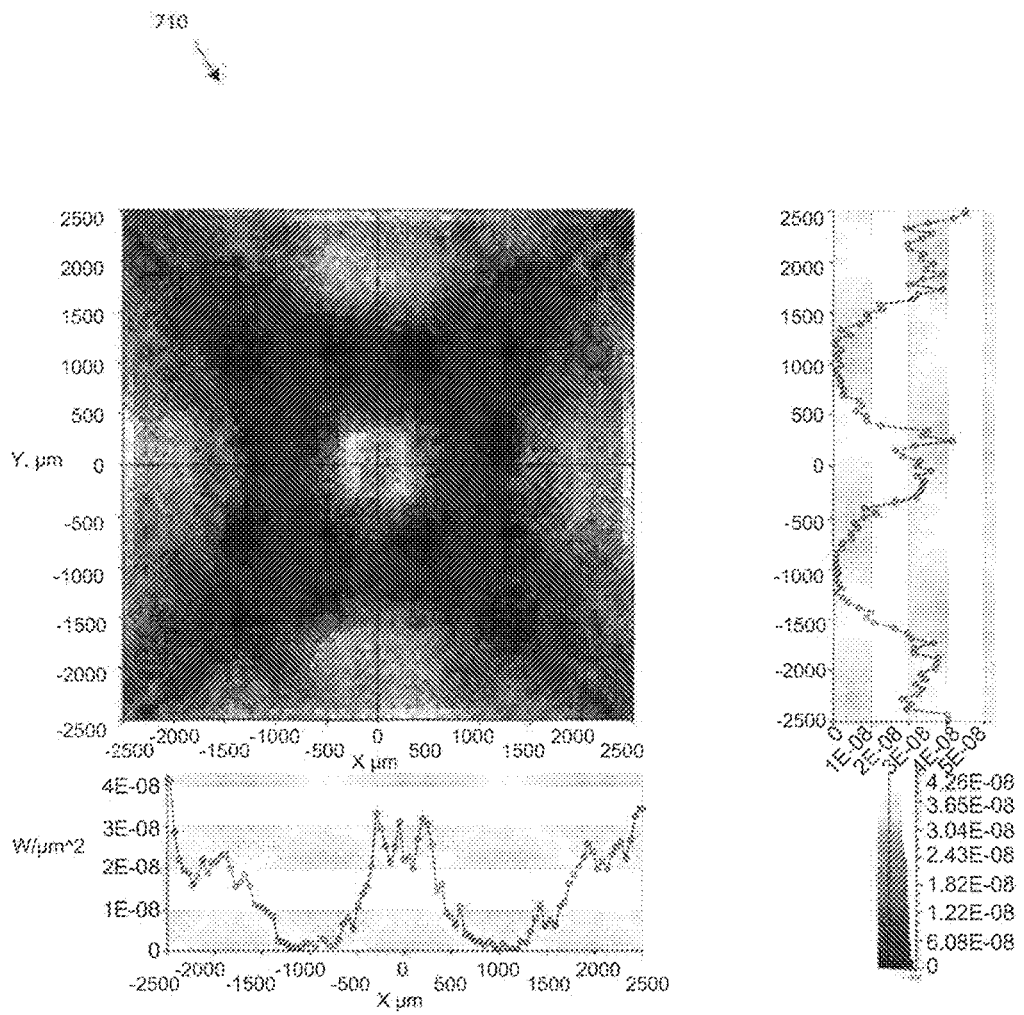
FIG. 7B is a simulation result illustrating non-uniform light output for an LED backlight without prisms for light in-coupling.

FIG. 7B is a simulation result graph 710 illustrating non-uniform light output for an LED backlight without sidewall prisms 633 for light in-coupling.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A light-emitting diode (LED) backlight system, comprising:
   a plurality of backlight segments, each backlight segment including:
   a light guide segment configured to guide light, the light guide segment having a smooth, flat top surface that is configured to emit at least some of the guided light from the light guide segment, the light guide segment extending between the top surface and a lower surface opposite the top surface, the light guide segment further defining a cavity that extends from the lower surface toward the top surface, the cavity having a top and sidewalls;
   a sidelight emitting LED positioned in the cavity and configured to emit light into the light guide segment through the sidewalls of the cavity; and
   an absorptive coating configured to prevent light from propagating between the light guide segment and any other light guide segment in the LED backlight system.

2. The LED backlight system of claim 1, further comprising a sidewall in-coupling structure positioned between a sidewall of the cavity and the sidelight emitting LED.

3. The LED backlight system of claim 1, further comprising at least one of a reflective layer and a top out-coupling structure positioned between the top of the cavity and the sidelight emitting LED.

4. The LED backlight system of claim 1, wherein each sidelight emitting LED is substantially centrally positioned in the respective backlight segment.

5. The LED backlight system of claim 1, wherein the lower surface is curved, the curved lower surface including four substantially triangular shaped faces.

6. The LED backlight system of claim 1, wherein the lower surface is substantially smooth, the substantially smooth lower surface terminating in edges that have a lesser height at corners as compared to centers of respective edges.

7. The LED backlight system of claim 1, wherein the lower surface intersects the sidewalls at a bottom edge of the sidewalls.

8. The LED backlight system of claim 1, wherein each light guide segment has a substantially rectangular shape.

9. The LED backlight system of claim 1, wherein the light guide segments are arranged in a rectilinear array.

10. The LED backlight system of claim 1, wherein the plurality of backlight segments are located adjacent to one another in an array that extends along a plane.

11. The LED backlight system of claim 10, wherein the flat top surface of the light guide segment is parallel to the plane.

12. The LED backlight system of claim 10, wherein the top of the cavity is parallel to the plane.

13. The LED backlight system of claim 10, wherein the sidewalls of the cavity are substantially orthogonal to the plane.

14. A light-emitting diode (LED) backlight system, comprising:
 a first light guide segment, the first light guide segment configured to guide light, the first light guide segment having a smooth first flat top surface that is configured to emit at least some of the guided light from the first light guide segment, the first light guide segment extending between the first flat top surface and a first lower surface opposite the first flat top surface, the first light guide segment further defining a first cavity that extends from the first lower surface toward the first flat top surface, the first cavity having a first top and first sidewalls;
 a first sidelight emitting LED positioned in the first cavity and configured to emit light into the first light guide segment through the first sidewalls of the first cavity;
 a second light guide segment, the second light guide segment configured to guide light, the second light guide segment having a smooth second flat top surface that is configured to emit at least some of the guided light from the second light guide segment, the second light guide segment further defining a second cavity having a second top and second sidewalls;
 a second sidelight emitting LED positioned in the second cavity and configured to emit light into the second light guide segment through the second sidewalls of the second cavity; and
 an absorptive coating configured to prevent light from propagating between the first light guide segment and the second light guide segment.

15. A light-emitting diode (LED) backlight system, comprising:
 a first light guide segment, the first light guide segment configured to guide light, the first light guide segment having a smooth first flat top surface that is configured to emit at least some of the guided light from the first light guide segment, the first light guide segment extending between the first flat top surface and a first lower surface opposite the first flat top surface, the first light guide segment further defining a first cavity that extends from the first lower surface toward the first flat top surface, the first cavity having a first top and first sidewalls;
 a first sidelight emitting LED positioned in the first cavity and configured to emit light into the first light guide segment through the first sidewalls of the first cavity;
 a second light guide segment, the second light guide segment configured to guide light, the second light guide segment having a smooth second flat top surface that is configured to emit at least some of the guided light from the second light guide segment, the second light guide segment further defining a second cavity having a second top and second sidewalls;
 a second sidelight emitting LED positioned in the second cavity and configured to emit light into the second light guide segment through the second sidewalls of the second cavity; and
 an absorptive coating configured to prevent light from propagating between the first light guide segment and the second light guide segment.

* * * * *